US006397365B1

United States Patent
Brewer et al.

(10) Patent No.: US 6,397,365 B1
(45) Date of Patent: May 28, 2002

(54) MEMORY ERROR CORRECTION USING REDUNDANT SLICED MEMORY AND STANDARD ECC MECHANISMS

(75) Inventors: Tony M. Brewer, Plano; Mike Dugan, Richardson, both of TX (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/313,849

(22) Filed: May 18, 1999

(51) Int. Cl.[7] .............................................. G11C 29/00
(52) U.S. Cl. ...................................................... 714/766
(58) Field of Search ................................ 714/753–755, 714/763–764, 766, 820

(56) References Cited

U.S. PATENT DOCUMENTS

| 4,849,978 A | 7/1989 | Dishon et al. .............. 714/805 |
|---|---|---|
| RE34,100 E | * 10/1992 | Hartness ...................... 714/763 |
| 5,418,796 A | 5/1995 | Price et al. .................. 714/762 |
| 5,463,644 A | 10/1995 | Rodi et al. ................... 714/766 |
| 5,469,450 A | * 11/1995 | Cho et al. .................... 714/766 |
| 5,491,702 A | * 2/1996 | Kinsel ......................... 714/753 |

FOREIGN PATENT DOCUMENTS

EP  0371243  10/1989  .......... G06F/11/08

OTHER PUBLICATIONS

Sundberg, Carl–Erik W., "Erasure and Error Decoding for Semiconductor Memories," IEEE Transactions on Computer, vol. C–27, No. 8; pp. 696–705.

\* cited by examiner

Primary Examiner—Albert Decady
Assistant Examiner—Shelly A Chase

(57) ABSTRACT

A system and method is presented for error detection and correction using redundant sliced memory wherein ECC codes are used to correct single bit errors and detect multi bit errors and to reconstruct lost data in real time.

17 Claims, 1 Drawing Sheet

MEMORY ERROR CORRECTION USING REDUNDANT SLICED MEMORY AND STANDARD ECC MECHANISMS

BACKGROUND

Dynamic Random Access Memory (DRAM) is used extensively in a variety of applications, especially in conjunction with digital microprocessors. In a typical configuration, several Central Processing Units (CPUs) will be interfaced with a Processor and Memory address device (PMA), as shown in FIG. 1. The PMA is interfaced with one or more Processor and Memory Data devices (PMD). Each PMD is interfaced with a plurality of Memory Modules (MM). The PMA functions to arbitrate the addresses received from each CPU, and directs each address to the correct PMD. The PMD receives the address and determines where within the MMs to read or write data. Each MM corresponds to a slice of to) data and is comprised of DRAM. The PMD also performs error correction operations.

The number of DRAM chips required to provide the needed memory capacity in a multi-processor system is large. The probability of a DRAM failing compared to the other components in the system is high. DRAMs can have single or multi-bit errors for a variety of reasons. Random single bit errors can often be caused by radiation bombardment. Cross talk on lines connected to the DRAM may also cause errors. Further, an entire DRAM device may fail. It is therefore desirable to provide some redundant memory, coupled with error detection and correction logic to minimize the adverse effect of the occurrence of errors. Preferably, an error detection and correction scheme minimizes the amount of redundant memory required while minimizing the computational overhead require for detection and correction. Typically, an error correction scheme is employed which reduces the probability of uncorrected errors to some acceptable level.

The classical approach to detection and correction of errors is by use of an error correction code (ECC). An error correction code associated with a slice of data is stored and utilized to determine if an error has occurred in the slice and to then correct the erroneous bit. Typical ECCs provide guaranteed single bit error correction and double-bit error detection. Additionally, many multi-bit errors can be detected. The weakness of these codes is that some multi-bit errors will appear to be single-bit errors and some multi-bit errors will not be detected at all (a no-error syndrome). More elaborate codes have been created which provide better detection and correction capability. These codes further reduce the possibility of data corruption at the expense of greater computational overhead.

Another solution targeted at an entire DRAM chip failure (either as a transient failure, or a permanent failure) is achieved by distributing the ECC across numerous DRAM chips so that no two bits covered by a single ECC domain are from a single DRAM chip. Thus, if the ECC code covers 64 bits of data, then all 64 bits of data are from different DRAMs. In this approach, a block of data is written to a DRAM in the memory system. Each bit of the block belongs to a different ECC domain and only one bit of each ECC may be stored on the DRAM. This approach works well in solving the problem of a single DRAM failure, but has some weaknesses. First, once a DRAM fails, any future problem (single bit or multi-bit errors) will cause the data to be non-correctable. This implies that field service personnel must quickly replace the failing DRAM component to ensure guaranteed levels of system availability. The second weakness of this approach is that since each bit of a DRAM memory line must belong to a different ECC domain, a large number of DRAMs must be addressed for error detection when a line of data is read. This results in significantly increased power consumption.

An alternative approach to error correction has been adapted from techniques used to solve disk errors. This approach is referred to as the RAID technique when applied to disks (Redundant Array of Independent Disks) and as checksum techniques when applied to memory. Checksum mechanisms employ a redundant DRAM and a checksum for data reconstruction when an error is detected. The checksum is obtained by forming the exclusive-or (XOR) operation between the data stored in a set of N DRAM blocks or MMs. The resultant checksum is then stored in a redundant MM or DRAM block, which has a capacity at least equal to the capacity of the other N DRAM blocks or MMs. More specifically, the data at each address, x, of each of the N MMs (or DRAM blocks) of data are XOR-ed to form a checksum that is stored in a corresponding address, x, of the redundant MM (or DRAM block). If a MM or DRAM block that contains data fails, then the data that was stored therein may be reconstructed by XORing the remaining DRAMS together with the checksum stored in the redundant DRAM block. This backup operation is typically performed by the PMD.

One prior art approach stores an entire memory line into each memory module. A disadvantage of this approach is that if a DRAM block fails, the entire process must be halted until the data of the failed DRAM block is reconstructed. Another disadvantage of this method is that in order to provide uniform access across all memory modules in the system, the DRAM used to store the checksum must be rotated among all of the DRAM blocks. This results in considerable additional complexity and computational overhead. It is also noted that the full bandwidth required for cache access is demanded of each DRAM block in this prior art approach.

Therefore, it is desirable to devise apparatus and methods for reconstructing lost data in real time without having to stop a process for reconstruction of lost data, and without having to rotate the checksum storage among different modules to achieve uniform bandwidth access.

SUMMARY OF THE INVENTION

An object of the present invention is therefore to provide methods and apparatus for reliable memory which do not require halting an application in operation to reconstruct lost data. Another object of the present invention is to provide uniform access of all memory modules in the memory system without increased complexity and computational overhead.

There are multiple approaches through which a line of memory can be stored into memory modules upon which checksum operations can be performed. A prior art approach is described in U.S. Pat. No. 4,849,978, which is incorporated herein by reference, which approach stores an entire memory line into each memory module. A disadvantage of this approach is that if a DRAM block fails, the entire process must be halted until the data of the failed DRAM block is reconstructed. Another disadvantage of this method is that in order to provide uniform access across all memory modules in the system, the DRAM used to store the checksum must be rotated among all of the DRAM blocks. This results in considerable additional complexity and computational overhead. It is also noted that the full bandwidth required for cache access is demanded of each DRAM block in this prior art approach.

The following inventive approach describes a system which need not be halted for reconstruction of data in a DRAM and in which the DRAM used to store the checksum need not be rotated among all the of the DRAM blocks.

The inventive approach is to store a slice of a memory line in each of N memory modules. According to one aspect of the present invention, a redundant memory slice is provided in addition to N data slices, where N is an integer. Each slice of memory may be implemented by separate DRAM chips. The redundant slice stores a checksum which may be used to reconstruct the data of any one of the N slices. The checksum is formed by XORing the N data slices together in a bit wise fashion. Thus, bit zero of the N data slices are XOR-ed together to produce bit zero of the redundant slice. Similarly, bit n of the redundant slice is created by XORing bit n of the N data slices. The XOR logical operator has the property that by XORing the checksum stored in the redundant slice with the data in N−1 of the data slices, the result will be the data that was stored in the remaining Nth data slice.

According to another aspect of the present invention, an error correction code (ECC) is provided for each slice, including the redundant slice, for single bit error detection and correction on a slice by slice basis. The ECC is also used to detect multi-bit errors occurring in a slice. If the ECC indicates a single bit error, the error is corrected. If the ECC indicates a multi-bit error, then the data for that slice is reconstructed using the checksum stored in the redundant slice.

According to another aspect of the present invention, data stored in the memory system is distributed across all of the N data slices. For example, if a memory line of data to be stored is 80 bits in length and there are 8 data slices, then ten bits of the block will be written to each data slice. This data is XOR-ed bit by bit to generate 10 bits of checksum to be stored in the redundant slice. Since all slices are accessed each cycle, uniform access of all memory modules is achieved. Since correction of multi-bit errors can be done on a memory line by memory line basis as each block is read from memory, the system need not be halted for reconstruction of the data in an entire DRAM.

The above described approach protects against failures in memory module data paths to XOR gates within an PMD chip.

According to another aspect of the present invention, the present invention can be adapted to small memory systems where it would be impractical because of cost to implement redundant memory and checksum operations. In this case, the present invention will still provide ECC type error detection and correction, but the redundant memory and checksum functions may be omitted.

Note that any one of the memory modules provided in the inventive memory system may be utilized as the redundant slice. Since all slices are accessed uniformly, there is no need for rotation of the redundant slice among the slices.

Therefore, it is an advantage of the present invention that an application need not be halted for reconstruction of data in an entire DRAM.

It is a further advantage of the present invention that there is no need for rotation of the redundant slice among the slices of a memory line.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
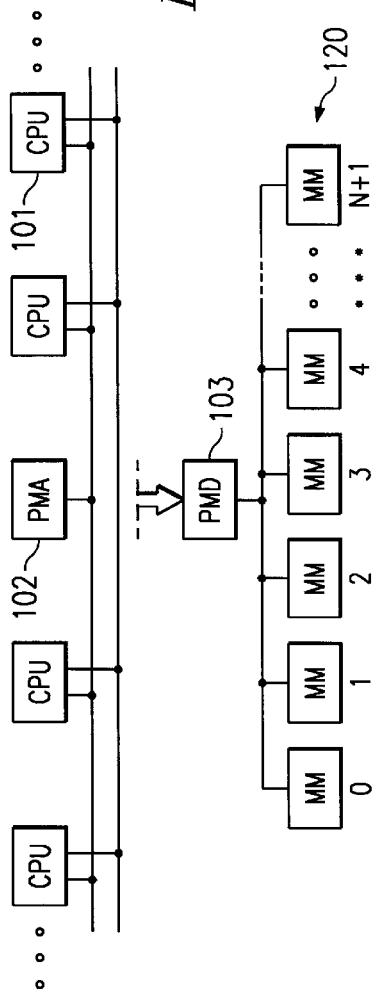
FIG. 1 is a functional block diagram of a multiprocessor system with memory and control units.
Figure 2:
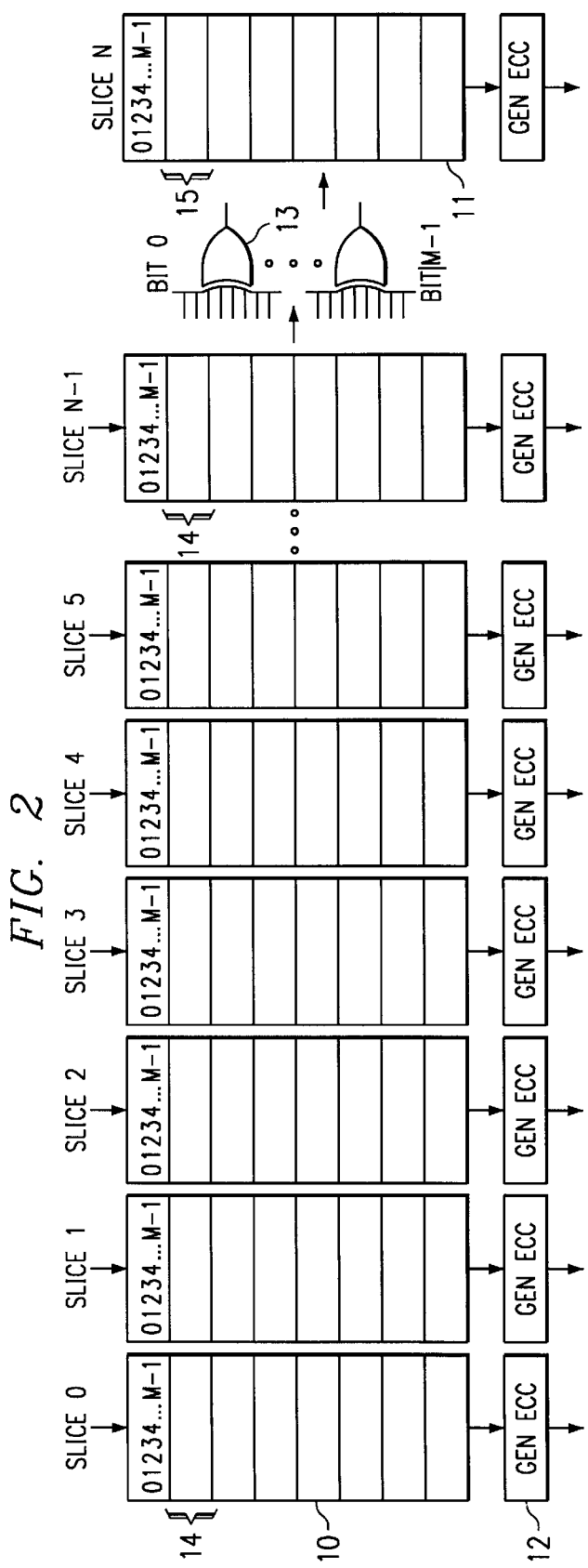
FIG. 2 is a functional block diagram of a memory system encompassed by the present invention.

A functional block diagram of a multiprocessor system with memory and a control unit is shown in FIG. 1. FIG. 2 depicts a memory system organized into N data slices 10 for storing data. An additional redundant slice 11 is provided for storing checksum information. Each of the N data slices 10 is comprised of M bits and redundant slice 11 is also comprised of M bits. Each slice may be implemented as a separate DRAM unit. A memory line is split into N separate data slices of M bits each. The N slices of a memory line are stored in the N different DRAM units.

It is noted that the connection of the MMs 120 to the rest of the computing system, preferably through the PMD 103, is effected in parallel. This parallel connection provides an important advantage to the operation of the inventive error detection and correction mechanism. In a prior art approach, each of the memory devices containing various sequences of bits were required to carry the entire bandwidth of the cache line through a series connection, potentially causing said memory devices to be a bottleneck in data flow and a limiting factor on the speed with which memory data could move through the computing system.

In a preferred embodiment of the present invention, by contrast, the plurality of MMs or other memory storage devices, are connected in parallel to the rest of the system, and therefore cooperate to carry the data line bandwidth. In this case therefore, the individual MMs, or other memory devices, need not carry the entire data line bandwidth. This change in configuration enables more efficient and rapid access to the data distributed among the various "slices" or MMs, and for more efficient operation of the data checking and correction process as a whole.

A functional block diagram of a process encompassed by the present invention is shown in FIG. 2. An error correction code (ECC) is generated for each slice by ECC generators 12. ECC generators 12 may be implemented in hardware as part of the MM structure or may be implemented in hardware by a PMD.

The ECC that is generated for each slice of a memory line 14 may be a standard ECC generated by any standard ECC algorithm known in the art, or it may be a proprietary ECC generated by a proprietary ECC algorithm. A variety of ECC algorithms may be practiced without departing from the scope of the present invention.

In order to perform an additional form of error detection and correction, a checksum is generated by performing an exclusive-or (XOR) operation for each bit in the checksum slice. An array of XOR operators 13 are provided for this purpose. XOR functionality may be provided by dedicated XOR hardware in a PMD 103 or other suitable processing device. For applications involving RAM, ROM, and other forms of very rapid random access memory, a software implementation is generally not appropriate. However, for storage mechanisms such as CD-ROMs, hard drives, DVDs, and the like, a software implementation of the XOR functionality is feasible. Bits in the same position in a sequence of M bits in each of N slices of a memory line 14 are XOR-ed with each other to determine the bit value to be placed in the redundant slice 11 as checksum data.

Specifically, the bits in the "0" position of each of the N data slices of memory line 14 are XOR-ed together, and the result is stored in "0" position bit, or bit 0, of the redundant slice 11. Similarly, bit 1 of each of the N data slices 14 are XOR-ed and the result is stored in bit 1 of the appropriate line 15 of redundant slice 11. This process is executed for all M bits of each of the N data slices 14.

The redundant slice 11 of memory containing the checksum information is used to regenerate one of the original memory line data slices when the value read from the corresponding data slice in memory is unreadable. The original memory line data slice is regenerated by bit wise exclusive-or'ing the redundant slice's data with each of the memory data slices' data except for the data slice which is unreadable. The exclusive-or operation described will yield the data originally present in the corrupted data slice. The data contained in the redundant slice of memory can be used to verify that the data read from the data slices in memory are the values which were originally written to memory. The verification is performed by exclusive or'ing the redundant slice's data with each of the data slice's data. The result of the bit wise exclusive or operations should be zero. A value of zero for each exclusive or operation indicates that the data is the same as that originally written to memory. A non zero value indicates that at least one of the data or redundant slices has been corrupted.

The error detection and correction function of the memory system of FIG. 2 operates as follows. A block of data is written to the memory system so that the bits of the block of data are uniformly distributed over all N data slices 10. For example, suppose the data block is 80 bits in length, and there are 8 data slices 10, i.e., N=8. Then, 10 data bits of the block are written to each slice. An ECC for each slice is generated by ECC generators 12. Also, the checksum generated by XOR operators 13 is stored in redundant slice 11. Note that the ECC for redundant slice 11 is generated from the data of redundant slice 11, not by bit-wise XORing the ECC of the original N data slices 10.

This approach to memory correction depicted in FIG. 2 can also protect against some failures of the PMD chip 103 (FIG. 1), as well as a data path leading from the memory modules 120 (FIG. 1) to the PMD chip 103 (FIG. 1). Specifically, the approach provides protection up to the point where the bit wise XOR operation is performed, such point being depicted by element 13 in FIG. 2.

When data is read from the memory system of FIG. 2, error detection and correction, if necessary, are performed. First, for each data slice 10, the ECC is checked and, if a single bit error is detected, single bit correction is performed using an ECC algorithm, which is well known in the art. Thus, on each slice, the data is in one of three states: data was correct in the memory, data required single bit correction and was corrected, or data has multi-bit errors that could not be corrected by the ECC algorithm. The following situations must be dealt with to provide the original data when reading memory:

Case 1. The ECC generated for each of the N data slices 10 and redundant slice 11 indicate correct data as read from memory. No action is required for this case. The data is obtained from the N data slices 10 which stored the original data. Note that in this case it is possible to verify that no slice incorrectly reported good data when in fact it had a multi-bit error which aliased to the no-error syndrome value. This is accomplished by verifying that the XOR result of the data read from the N original slices results in the value read from the redundant slice.

Case 2. The ECC of all of the N data slices 10 report either correct data as read from memory, or that a single bit error had occurred and was corrected. In this case data is obtained from the N data slices 10. As in case number one, the XOR result of the data read from the N data slices should match the data read from the redundant slice provided that a multi-bit error which aliased to the no-error syndrome value did not occur.

Case 3. The ECC of a single data slice 10 indicates a multi-bit error and the other data slices 10 have no error, or a corrected single bit error. In this case the multi-bit error data is discarded and the other N−1 data slices and redundant slice 11 are bit wise XOR-ed to recreate the data of the slice with the multi-bit error. Note that although the data was able to be re-constructed, it is not possible to verify whether one of the other slices had a multi-bit error which aliased to the no error ECC syndrome value. The probability that a multi-bit error is not detected or is detected as a correctable single bit error is the same as that in a system which only employs ECC memory protection. However the probability that a detected multi-bit error occurs on one slice of a memory line read and an undetected multi-bit error occurs on a different slice of the same memory line read will be significantly lower.

Case 4. Multiple slices indicate multi-bit errors. For this case, it is not possible to reconstruct the original data. The coherency operation must return an error to the issuing processor or I/O controller.

Note that any one of the N+1 memory modules provided in the memory system of FIG. 2 may be utilized as the redundant slice. Since all slices are accessed uniformly there is no need for rotation of the redundant slice among the slices.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for detection and correction of single and multi-bit memory errors in a memory system comprising:
   an array of memory modules for storing a plurality of data slices;
   a redundant memory module for storing a checksum, said redundant memory having at least as much bit storage space as each memory module of said array of memory modules;
   an array of error correction code generators for generating an error correction code for each of said data slices and for generating an error correction code for said checksum; and
   an array of exclusive-or operators for forming said checksum from the bits of said data slices, wherein:
      the checksum comprises space for a number of bits corresponding to a number of bits in each said slice, each bit in each said slice having a position in an order of bits; and
      each bit in said checksum is determined by performing an ex-or operation on all bits in the same position in the order of bits of each said slice, thereby providing said checksum with sufficient information to enable correction of a data slice with a multi-bit error, wherein said checksum is XOR-ed with the data of all but one of said data slices to reconstruct data stored in the one of said data slices that is not XOR-ed with said checksum.

2. The apparatus of claim 1, wherein said array of memory modules is accessed by a computer system in parallel, thereby obviating a need for each said memory module to handle a data transmission bandwidth of an entire cache line.

3. The apparatus of claim 2, wherein said checksum in said redundant memory module can be used in combination with all but one of said memory modules to correct a multi-bit error detected by an error correction code of a data slice, thereby enabling said apparatus to tolerate a simultaneous failure of a single bit in one data slice and a multi-bit failure in another data slice.

4. The apparatus of claim 1, wherein each said error correction code comprises:
   an ability to detect and correct single bit errors; and
   an ability to detect a multi-bit error in a memory module.

5. The apparatus of claim 1, wherein a block of data to be stored in said memory distributed uniformly across all of said data slices.

6. The apparatus of claim 1, wherein said ex-or operators are implemented in hardware.

7. A method for detecting and correcting single and multi-bit memory errors in a memory system, the method comprising the steps of:
   distributing data in a memory line equally in a plurality of data slices, with each said slice stored on a memory module associated with said each data slice, wherein each said data slice comprises a sequence of bits of equal length, said sequence having an order and each bit having a position in said order;
   performing XOR operations on all bits in the same position in the order of bits in each said data slice, thereby producing a sequence of ex-or result bits forming a checksum;
   storing said checksum in a redundant memory module;
   generating an error correction code for each of said data slices and an error correction code for use by said checksum in correcting multi-bit errors in said data slices; and
   XORing said checksum with the data of all but one of said data slices to reconstruct data stored in the one of said data slices that is not XOR-ed with said checksum, where a multi-bit error was detected in said one of said data slices that is not XOR-ed with said checksum.

8. The method of claim 7, comprising the further steps of:
   detecting single bit errors in said data slices; and
   correcting said single bit errors in said data slices.

9. The method of claim 8, comprising the further step of:
   detecting multi-bit errors in said data slices.

10. An apparatus for detection and correction of single and multi-bit memory errors in a memory system comprising:
    an array of memory modules for storing a plurality of data slices, said data slices having data;
    a redundant memory module for storing a checksum, said redundant memory having at least as much bit storage space as each memory module of said array of memory modules;
    an array of error correction code generators for generating an error correction code for each of said data slices and for generating an error correction code for said checksum; and
    an array of exclusive-or operators for forming said checksum from the bits of said data slices, wherein the checksum comprises space for a number of bits corresponding to a number of bits in each said slice, each bit in each said slice having a position in an order of bits, and wherein each bit in said checksum is determined by performing an XOR operation on all bits in the same position in the order of bits of each said slice, thereby providing said checksum with sufficient information to enable correction of a data slice with a multi-bit error; and
    a parallel connection between said array of memory modules and a computer system accessing said array, thereby obviating a need for each said memory module to handle a data transmission bandwidth of an entire data line, wherein said checksum enables said apparatus to restore the data of a data slice having a multi-bit error by performing an XOR operation on bits of said checksum with bits in all data slices except for said data slice having a multi-bit error.

11. An apparatus for detection and correction of single and multi-bit memory errors in a memory system comprising:
    an array of memory modules for storing a plurality of data slices;
    a redundant memory module for storing a checksum, said redundant memory having at least as much bit storage space as each memory module of said array of memory modules;
    an array of error correction code generators for generating an error correction code for each of said data slices and for generating an error correction code for said checksum; and
    an array of exclusive-or operators for forming said checksum from the bits of said data slices, wherein the checksum comprises space for a number of bits corresponding to a number of bits in each said slice, each bit in each said slice having a position in an order of bits, and wherein each bit in said checksum is determined by performing an ex-or operation on all bits in the same position in the order of bits of each said slice, thereby providing said checksum with sufficient information to enable correction of a data slice with a multi-bit error, and wherein the apparatus protects against a failure of a data path between a memory module and a PMD chip.

12. An apparatus for detection and correction of single and multi-bit memory errors in a memory system comprising:

an array of memory modules for storing a plurality of data slices;

a redundant memory module for storing a checksum, said redundant memory having at least as much bit storage space as each memory module of said array of memory modules;

an array of error correction code generators for generating an error correction code for each of said data slices and for generating an error correction code for said checksum; and an array of exclusive-or operators for forming said checksum from the bits of said data slices, wherein the checksum comprises space for a number of bits corresponding to a number of bits in each said slice, each bit in each said slice having a position in an order of bits, and wherein each bit in said checksum is determined by performing an ex-or operation on all bits in the same position in the order of bits of each said slice, thereby providing said checksum with sufficient information to enable correction of a data slice with a multi-bit error, and wherein a plurality of single bit errors on different memory modules and a multi-bit error on one said memory module may be corrected without disrupting other functions of a computer system to which the apparatus is connected.

13. A method for detecting and correcting single and multi-bit memory errors in a memory system, the method comprising the steps of:

distributing data in a memory line equally in a plurality of data slices, with each said slice stored on a memory module associated with said each data slice, wherein each said data slice comprises a sequence of bits of equal length, said sequence having an order and each bit having a position in said order;

performing XOR operations on all bits in the same position in the order of bits in each said data slice, thereby producing a sequence of ex-or result bits forming a checksum;

storing said checksum in a redundant memory module;

generating an error correction code for each of said data slices and an error correction code for use by said checksum in correcting multi-bit errors in said data slices;

correcting a multi-bit error in one said data slice; and correcting single bit errors in a plurality of other said data slices, thereby enabling the memory system to simultaneously tolerate a single multi-bit error in a data slice, and a plurality of single bit errors in other data slices without external intervention.

14. The method of claim 13 comprising the further step of:

protecting against a failure of a data path between a memory module and a PMD chip.

15. The method of claim 13 comprising the further step of:

XOR-ing the data of said data slices with said checksum thereby producing a data verification result having a sequence of bits, wherein correct data in all of said data slices will yield a sequence of zero value bits in said verification result.

16. The method of claim 13 wherein the plurality of data slices are accessed by a computer system in parallel thereby cooperating to satisfy a data transmission bandwidth of a data cache connection to said memory system.

17. An apparatus for detection and correction of single and multi-bit memory errors in a memory system comprising:

an array of memory modules for storing a plurality of data slices, said data slices having data;

a redundant memory module for storing a checksum, said redundant memory having at least as much bit storage space as each memory module of said array of memory modules;

an array of error correction code generators for generating an error correction code for each of said data slices and for generating an error correction code for said checksum; and an array of exclusive-or operators for forming said checksum from the bits of said data slices, wherein the checksum comprises space for a number of bits corresponding to a number of bits in each said slice, each bit in each said slice having a position in an order of bits, and wherein each bit in said checksum is determined by performing an XOR operation on all bits in the same position in the order of bits of each said slice, thereby providing said checksum with sufficient information to enable correction of a data slice with a multi-bit error; and a parallel connection between said array of memory modules and a computer system accessing said array, thereby obviating a need for each said memory module to handle a data transmission bandwidth of an entire data line, wherein said array of error correction code generators cooperates with said checksum to enable said apparatus to correct a multi-bit error on one said data slice, and a plurality of simultaneously existing single bit errors on a plurality of other said data slices.

* * * * *